(12) United States Patent
Blum et al.

(10) Patent No.: US 7,384,050 B2
(45) Date of Patent: Jun. 10, 2008

(54) CART FOR PORTABLE OXYGEN

(76) Inventors: Walter Blum, 21 Brook La., Great Neck, NY (US) 11023; Nico Roger, 21 Brook La., Great Neck, NY (US) 11023

( * ) Notice: Subject to any disclaimer, the term of this patent is extended or adjusted under 35 U.S.C. 154(b) by 413 days.

(21) Appl. No.: 11/230,865

(22) Filed: Sep. 20, 2005

(65) Prior Publication Data
US 2007/0063469 A1   Mar. 22, 2007

(51) Int. Cl.
*B62B 1/00* (2006.01)
(52) U.S. Cl. .................. 280/47.26; 280/79.5; 280/651; 280/47.27
(58) Field of Classification Search ............. 280/47.24, 280/47.26, 47.19, 79.11, 79.3, 79.6, 79.5, 280/652, 639, 47.27, 651
See application file for complete search history.

(56) References Cited

U.S. PATENT DOCUMENTS

| | | | | |
|---|---|---|---|---|
| 2,381,858 | A * | 8/1945 | Austin ...................... | 280/47.24 |
| 4,050,708 | A * | 9/1977 | Samardzija et al. ..... | 280/47.26 |
| 4,432,470 | A * | 2/1984 | Sopha ........................ | 222/135 |
| 4,625,949 | A * | 12/1986 | Walker ..................... | 280/47.26 |
| 4,753,445 | A * | 6/1988 | Ferrare .................... | 280/47.131 |
| 5,071,148 | A * | 12/1991 | Salvucci, Sr. ............ | 280/47.24 |
| 5,180,179 | A * | 1/1993 | Salvucci .................. | 280/47.26 |
| 5,340,136 | A * | 8/1994 | MacNeil et al. ......... | 280/47.24 |
| 5,393,080 | A * | 2/1995 | Ross ........................ | 280/47.26 |
| 5,431,422 | A * | 7/1995 | Gamache ................. | 280/47.19 |
| 5,570,895 | A * | 11/1996 | McCue et al. ........... | 280/47.19 |
| 5,947,351 | A * | 9/1999 | Garofalo et al. ......... | 280/47.29 |
| 6,047,983 | A * | 4/2000 | Day, III ...................... | 280/652 |
| 6,053,516 | A * | 4/2000 | Ottaway .................... | 280/79.5 |
| 6,315,310 | B1 * | 11/2001 | Hurt .......................... | 280/79.5 |
| 6,454,281 | B1 * | 9/2002 | Pearson ................... | 280/47.26 |
| 6,565,103 | B2 * | 5/2003 | Wilson .................... | 280/47.24 |
| 6,733,017 | B2 * | 5/2004 | Intravatola ................. | 280/79.6 |
| 2002/0093161 | A1* | 7/2002 | Udwin et al. ............... | 280/639 |
| 2006/0082086 | A1* | 4/2006 | Donaldson ............... | 280/47.27 |

* cited by examiner

*Primary Examiner*—Hau V Phan
(74) *Attorney, Agent, or Firm*—Collard & Roe, P.C.

(57) ABSTRACT

An oxygen cart comprises a post connected to a handle and a bracket, a plurality of wheels connected to an underside of the bracket, at least one tank holder connected to an upper side of the bracket for holding portable gas tanks, and a tank support wall connected to and extending up from the tank holder said tank support wall keeping a gas tank in the holder when the cart is moving. There is a cart support surface connected to a lower end of the tank support wall for stabilizing the cart in an upright position when the cart is not moving. In order to accommodate several sizes of tanks, the tank holder has an upper section and a lower section, the upper section having diameter larger than the lower section, such that the upper section accommodates one size gas tank, and the lower section accommodates a different, smaller size gas tank. To accommodate an even smaller tank, a ring having an inner circumference that is smaller than a circumference of the lower section is used. The ring is placed inside the lower section allows the lower section to accommodate a gas tank having a circumference equal to or smaller than the inner circumference of the ring.

2 Claims, 3 Drawing Sheets

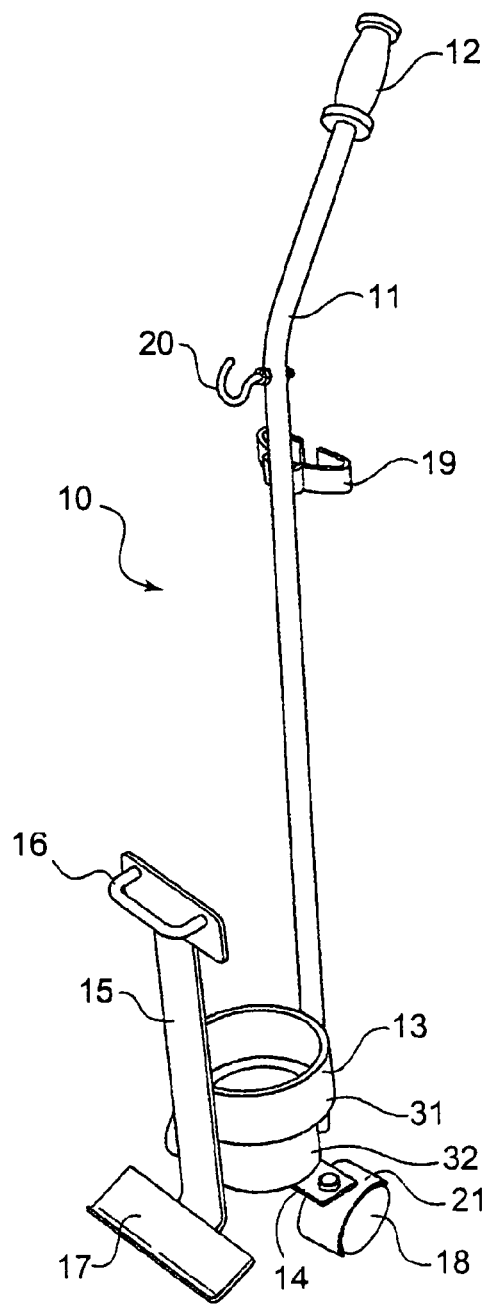
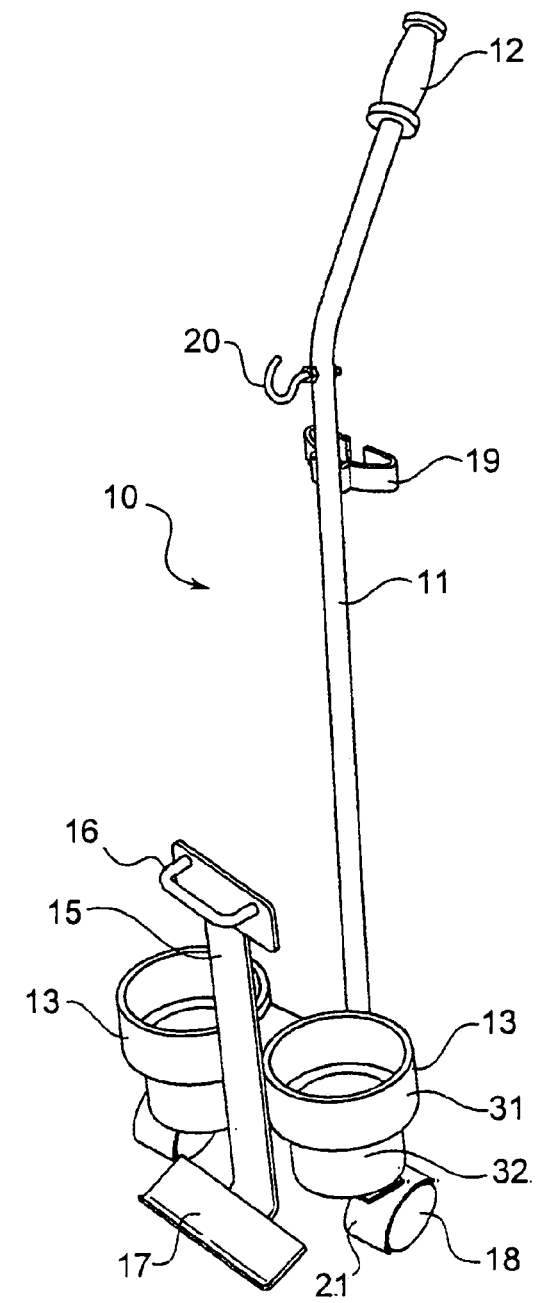
FIG. 1
FIG. 2

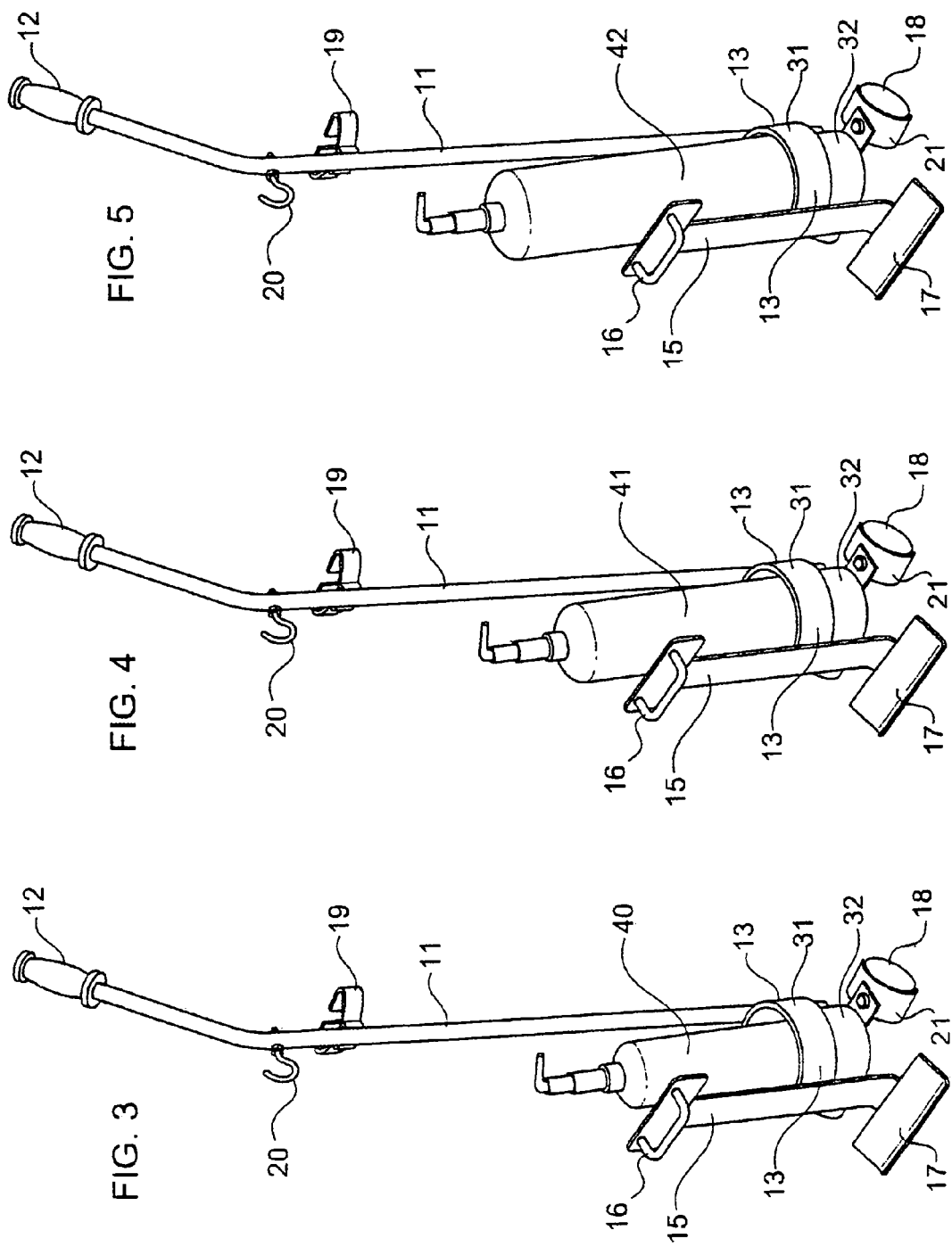

CART FOR PORTABLE OXYGEN

BACKGROUND OF THE INVENTION

1. Field of the Invention

The invention relates to a cart for portable oxygen tanks. In particular, the invention relates to a cart that can accommodate three different sizes of tanks.

2. The Prior Art

Portable oxygen tanks are used by people who need supplemental oxygen, when they travel outside the home. The cart is generally equipped with wheels and can carry a supplemental oxygen tank and its corresponding equipment. The problem with existing oxygen tanks is that they are often expensive and difficult to maneuver, and can only accommodate one size of tank, when there are tanks of several different sizes on the market, namely size A, B and C.

SUMMARY OF THE INVENTION

It is therefore an object of the invention to provide a cart for supplemental oxygen tanks that is easy to maneuver, even over curbs, inexpensive to produce, and which can accommodate several different sizes of oxygen tanks and even multiple tanks on a single cart.

These and other objects of the invention are accomplished by an oxygen cart comprising a post connected to a handle and a bracket, a plurality of wheels connected to an underside of the bracket, at least one tank holder connected to an upper side of the bracket for holding portable gas tanks, a tank support wall connected to and extending up from the tank holder said tank support wall keeping a gas tank in the holder when the cart is moving, and a cart support surface connected to a lower end of the tank support wall. The cart support surface stabilizes the cart in an upright position when the cart is not moving.

There is preferably a bracket connected to the post for holding equipment, such as a monitor or gauge, for use with a gas tank disposed in the tank holder. There is also preferably a hook on the post for holding accessories and bags.

The post can be adjustable in height, to accommodate users of different sizes. This can be accomplished via a telescoping pole as the post.

In order to accommodate several sizes of tanks, the tank holder has an upper section and a lower section, the upper section having a diameter larger than the lower section, such that the upper section accommodates one size gas tank, and the lower section accommodates a different, smaller size gas tank.

To accommodate an even smaller tank, a ring having an inner circumference that is smaller than a circumference of the lower section is used. The ring is placed inside the lower section allows the lower section to accommodate a gas tank having a circumference equal to or smaller than the inner circumference of the ring.

In another embodiment, there are two tank holders connected to the bracket, so that two tanks can be simultaneously transported with the tank.

There can be an additional handle on the tank support wall, to allow the cart to be carried up stairs or through rough terrain. One hand holds the first handle on the post, and the other hand can pick up the cart via the second handle.

The wheels preferably have guards covering top and sides of the wheels, to prevent dirt and liquids from splashing upwards as the wheels rotate.

The handle is preferably made of flexible non-slip material, such as rubber or silicone. Other materials could also be used.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views:

FIG. 1 shows a perspective view of one embodiment of the cart according to the invention;

FIG. 2 shows a perspective view of another embodiment of the cart according to the invention;

FIG. 3 shows a cart with a small tank positioned therein;

FIG. 4 shows a cart with a medium tank positioned therein;

FIG. 5 shows a cart with a large tank positioned therein; and

DETAILED DESCRIPTION OF THE PREFERRED EMBODIMENT

Figure 6:
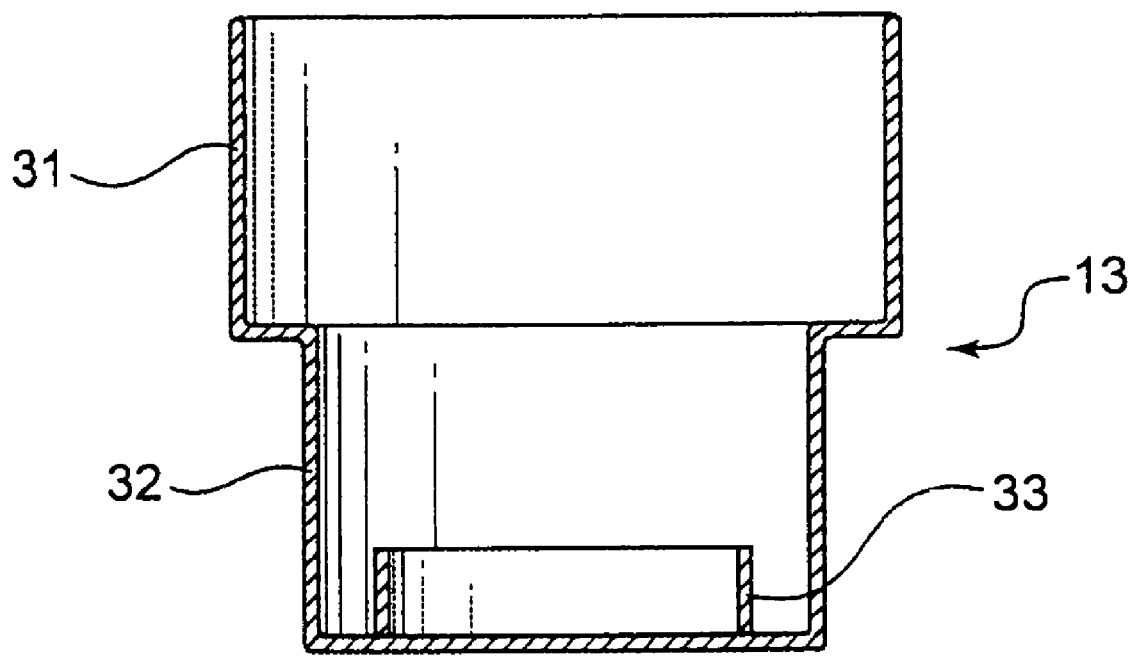
FIG. 6 shows a cross-section of the tank holder, having a ring positioned therein for holding the small tank.

Referring now in detail to the drawings and, in particular, FIG. 1 shows cart 10 according to the invention. Cart 10 comprises a post 11 connected to a handle 12. Post 11 can be adjustable in height, via telescoping or other, mechanism. At the other end of post 11 is a bracket 14, onto which a tank holder 13 is attached. A plurality of wheels 18 are disposed on the underside of bracket 14. Attached to tank holder 13 is a tank support structure 15, against which gas tanks can lean during transport. There is an additional handle 16 attached to tank support structure 15, to allow cart 10 to be easily picked up by the user. A cart support 17 is disposed at the bottom of tank support structure 15, to allow cart 10 to rest in an upright position when not in use.

There is a bracket 19 disposed on post 11 to allow various monitors or gauges to be attached to cart 10. There is also a hook 20, to allow the user to carry bags with cart 10.

Wheels 18 are covered with guards 21, that prevent liquids and debris from splashing up against the user.

FIG. 2 shows an alternative embodiment of the cart 10 according to the invention. In this embodiment, two tank holder 13 are disposed side-by-side on cart 10. Tank support structure 15 is wide enough at the top to support two tanks when they are placed in tank holder 13.

FIG. 3 shows cart 10 with a small size "A" tank 40 disposed therein. Tank holder 13 has a lower section 32 of smaller circumference, and an upper section 31 of a larger circumference lower section 31 accommodates small tanks 40 and medium size tanks 41 (sizes A and B, respectively) (shown in FIGS. 3 and 4), while upper section 31 accommodates large, size C tanks 42, as shown in FIG. 5. Large size tanks 42 rest on the lip created between upper section 31 and lower section 32.

FIG. 6 shows a cross-section of tank holder 13, showing upper section 31, and lower section 32. Upper section 31 has a diameter of approximately 6 inches, and lower section 32 has a diameter of approximately 4 inches. Other sizes could also be made. Lip 35 is disposed between the two sections to form a resting platform for large size tanks 42. To accommodate the small size tanks 40 even better, a ring 33 can be placed in the bottom of tank holder 13. Ring 33 has an inner circumference that matches the circumference of small tank 40.

Cart 10 can be either pushed or drawn by the user. It is light in weight and easily stored, as it takes up very little floor space.

Accordingly, while only a few embodiments of the present invention have been shown and described, it is obvious that many changes and modifications may be made thereunto without departing from the spirit and scope of the invention.

What is claimed is:

1. A cart comprising:
    a post having two ends, one end being connected to a handle and the other end being connected to a bracket;
    a plurality of wheels connected to an underside of the bracket;
    at least one tank holder connected to an upper side of the bracket for holding portable gas tanks;
    a tank support structure connected to and extending up from the tank holder said tank support structure keeping a gas tank in the holder when the cart is moving; and
    a cart support connected to a lower end of the tank support structure, said cart support stabilizing the cart in an upright position when the cart is not moving;
    wherein the tank holder has an upper section and a lower section, the upper section having a diameter larger than the lower section, such that said upper section accommodates one size gas tank, and said lower section accommodates a different, smaller size gas tank.

2. The cart according to claim 1, further comprising a ring having an inner circumference that is smaller than a circumference of said lower section, wherein placing the ring inside the lower section allows the lower section to accommodate an even smaller gas tank having a circumference equal to or smaller than the inner circumference of the ring.

* * * * *